United States Patent
Kim

(10) Patent No.: US 12,175,762 B2
(45) Date of Patent: Dec. 24, 2024

(54) SENSOR FUSION DEVICE FOR VEHICLE

(71) Applicant: HYUNDAI MOBIS CO., LTD., Seoul (KR)

(72) Inventor: In Hyuk Kim, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 1067 days.

(21) Appl. No.: 17/101,613

(22) Filed: Nov. 23, 2020

(65) Prior Publication Data

US 2021/0179136 A1 Jun. 17, 2021

(30) Foreign Application Priority Data

Dec. 16, 2019 (KR) .................. 10-2019-0168265

(51) Int. Cl.
*G06V 20/56* (2022.01)
*B60W 60/00* (2020.01)
*G06F 18/25* (2023.01)
*G06V 10/80* (2022.01)

(52) U.S. Cl.
CPC ........... *G06V 20/56* (2022.01); *B60W 60/001* (2020.02); *G06F 18/25* (2023.01); *G06V 10/80* (2022.01)

(58) Field of Classification Search
CPC ........ G06F 18/25; G06V 10/80; G06V 20/56; B60W 60/001
See application file for complete search history.

(56) References Cited

U.S. PATENT DOCUMENTS

| 10,015,802 | B2 | 7/2018 | Matischek et al. |
| 2018/0067489 | A1* | 3/2018 | Oder ..................... G05D 1/0257 |
| 2019/0383631 | A1* | 12/2019 | Bigio ..................... G06V 20/59 |
| 2020/0089225 | A1* | 3/2020 | Sadakiyo ............. G05D 1/0088 |

(Continued)

FOREIGN PATENT DOCUMENTS

| CN | 108476161 A | 8/2018 |
| CN | 109823325 A | 5/2019 |

(Continued)

OTHER PUBLICATIONS

Lieske, Tobias, et al. "System on chip generation for multi-sensor and sensor fusion applications." 2017 International Conference on Embedded Computer Systems: Architectures, Modeling, and Simulation (SAMOS). IEEE, 2017. (Year: 2017).*

(Continued)

*Primary Examiner* — Benjamin P Geib
(74) *Attorney, Agent, or Firm* — MORGAN, LEWIS & BOCKIUS LLP

(57) ABSTRACT

A sensor fusion device for a vehicle integrates and provides a plurality of sensor data provided in the vehicle. The sensor fusion device includes: a data input unit configured to receive sensor data of a plurality of sensors through a sensor interface and provided with a data input buffer to manage input traffic of the sensor data; a data integration unit configured to produce integrated sensor data by integrating the sensor data and provided with an output buffer to integrate the integrated sensor data; a memory configured to provide a storage space for operating the data input unit and the data integration unit; and a main control unit configured to control operations of the data input unit and the data integration unit.

8 Claims, 11 Drawing Sheets

(56) References Cited

U.S. PATENT DOCUMENTS

2020/0234512 A1* 7/2020 Lourakis ............... H04L 67/12
2021/0218488 A1* 7/2021 Zhang ................... H04W 84/18

FOREIGN PATENT DOCUMENTS

| CN | 110321068 A | 10/2019 |
|----|----|----|
| JP | 2007-045221 A | 2/2007 |
| JP | 2008-003779 A | 1/2008 |
| JP | 2008-3779 A | 1/2008 |
| KR | 10-2009-0000931 A | 1/2009 |
| KR | 10-1483994 B1 | 1/2015 |
| KR | 10-2017-0041466 A | 4/2017 |
| KR | 10-2018-0035993 A | 4/2018 |
| KR | 10-1921074 B1 | 11/2018 |

OTHER PUBLICATIONS

Office Action issued in corresponding Korean Patent Application No. 10-2019-0168265 dated Jul. 9, 2021, with English translation.
Office Action issued on Dec. 24, 2020 from the corresponding Korean Application No. 10-2019-0168265, 5 pp.
Office Action issued in corresponding Chinese Patent Application No. 202011370459.2 dated Apr. 18, 2023, with English translation.

* cited by examiner

SENSOR FUSION DEVICE FOR VEHICLE

CROSS-REFERENCE TO RELATED APPLICATIONS

This application claims priority to and the benefit of Korean Patent Application No. 10-2019-0168265, filed on Dec. 16, 2019, the entire contents of which are incorporated herein by reference.

FIELD

The present disclosure relates to a sensor fusion device for a vehicle. In more detail, the present disclosure relates to a sensor fusion device for a vehicle, which integrates and provides a plurality of sensor data provided in a vehicle.

BACKGROUND

The statements in this section merely provide background information related to the present disclosure and may not constitute prior art.

Various types of research and development are being conducted on technologies for improving safety and convenience of vehicles. For example, in order to reduce burden on a driver and improve convenience, an advanced driver assistance system (ADAS) is mounted in the vehicle to actively provide information about a vehicle condition, a driver condition, and a surrounding environment.

Recently, there is a rapidly increasing interest in autonomous driving technology. Regarding the autonomous driving, the U.S. SAE defines five stages of autonomous driving and discloses, for each stage, a relationship between a degree of freedom of the driver and transmission of driving authority between the driver and an autonomous driving system.

In the ADAS technology or the autonomous driving technology, sensors, which detect conditions such as a position of the vehicle, an internal condition of the vehicle, an external environment, and a driver condition, are considered as particularly important elements. An inertial measurement unit (IMU), a global positioning system (GPS), a camera, a lidar, and the like may be used to recognize a position of the vehicle, and a camera, a lidar, a radar, an ultrasonic sensor, and the like are used to recognize an external environment or an object or measure a distance. In addition, various sensors are mounted in the vehicle to determine the internal condition of the vehicle. In addition, a plurality of sensors such as a camera or a radar is mounted in the vehicle.

In the case in which the plurality of sensors is provided in the vehicle, it is desired to integrate, transmit, and process the sensor data. However, in a sensor fusion technology for integrating the sensor data in the related art, the sensor data are transmitted to a data processing unit as it is, such that a bandwidth of a communication line needs to be increased. However, we have discovered that because the sensor data are not consistently organized, there is a problem in that it is difficult to efficiently process the sensor data.

SUMMARY

The present disclosure provides a sensor fusion device for a vehicle, which integrates and processes sensor data in accordance with the time and types of inputted sensor data in order to efficiently and integrally process the sensor data, thereby improving efficiency in transmitting and processing the sensor data.

In one form of the present disclosure, a sensor fusion device for a vehicle includes: a data input unit configured to receive sensor data of a plurality of sensors through a sensor interface and provided with a data input buffer to manage input traffic of the sensor data; a data integration unit configured to produce integrated sensor data by integrating the sensor data and provided with an output buffer to integrate the integrated sensor data; a memory configured to provide a storage space for operating the data input unit and the data integration unit; and a main control unit configured to control operations of the data input unit and the data integration unit.

In the exemplary form, the data input unit may include: a data extraction unit configured to receive the sensor data and extract desired information; and a time stamp configured to add time information to the extracted data.

In the exemplary form, the data input buffer may include: a plurality of input buffers; and an input buffer control unit configured to manage statuses of the plurality of input buffers, and thresholds may be set to the plurality of input buffers to manage an input and an output of the data.

The thresholds may include: a global threshold applied in common to the plurality of input buffers; and a local threshold individually applied to the plurality of input buffers.

The plurality of input buffers may be provided in accordance with types of sensors.

The main control unit may set priorities in accordance with the thresholds of the plurality of input buffers and control the data stored in the plurality of input buffers to store the data in the memory.

In the exemplary form, the data integration unit may operate in any one of an identical sensor mode in which the sensor data of the identical sensors, among the plurality of sensors, are integrated to produce the integrated sensor data, an identical time mode in which the sensor data in the identical time are integrated to produce the integrated sensor data, and an adaptive mode in which image data of an image frame and the sensor data in accordance with the identical sensor mode or the identical time mode are integrated to produce the integrated sensor data.

The adaptive mode may include the image data in an active region of the image frame, and include integrated sensor data, which are integrated in accordance with any one of the identical sensor mode and the identical time mode, in a blank region of the image frame.

In the exemplary form, the data integration unit may include: a first output buffer control unit configured to receive the sensor data in accordance with information about an address of the memory transmitted from the main control unit; and a second output buffer control unit configured to integrate the sensor data temporarily stored in the output buffer.

In another form of the present disclosure, a sensor fusion method includes: an input step of receiving a plurality of sensor data through a sensor interface; a processing step of processing the inputted sensor data; a storing step of buffering the processed sensor data by a data input buffer and storing the sensor data in the memory; and a producing step of temporarily storing the sensor data, which are stored in the memory, in an output buffer and producing integrated sensor data by integrating the sensor data.

In one exemplary form, the processing step may include a process of extracting desired data from the inputted sensor data and adding time information to the extracted data.

In the exemplary form, the data input buffer includes a plurality of input buffers, and the storing step may set and manage thresholds of the plurality of input buffers.

The thresholds may include: a global threshold applied in common to the plurality of input buffers; and a local threshold individually applied to the plurality of input buffers.

When at least one of the plurality of input buffers exceeds the predetermined threshold, the storing step may set the priority to be transmitted to the memory in consideration of the threshold of each of the input buffers and the amount of currently stored data.

In the exemplary form, the producing step may operate in any one of an identical sensor mode in which the sensor data of the identical sensors, among the plurality of sensors, are integrated to produce the integrated sensor data, an identical time mode in which the sensor data in the identical time are integrated to produce the integrated sensor data, and an adaptive mode in which image data of an image frame and the sensor data in accordance with the identical sensor mode or the identical time mode are integrated to produce the integrated sensor data.

The adaptive mode may include the image data in an active region of the image frame, and include integrated sensor data, which are integrated in accordance with any one of the identical sensor mode and the identical time mode, in a blank region of the image frame.

In the exemplary form, when a data processing unit for receiving the integrated sensor data is prepared, the producing step may further include transmitting the integrated sensor data to the data processing unit.

According to the present disclosure, the sensor data including time information may be integrated in accordance with characteristics for each time and for each sensor type, and as a result, the vehicle resource desired to transmit and process the data may be reduced, and the efficiency in transmitting and processing the sensor data may be improved.

According to the feature of the present disclosure, with the data traffic management of the input and output buffers, it is possible to maintain an appropriate bandwidth for transmitting the sensor data, improve efficiency in utilizing the sensor data in accordance with the setting and processing of the priority, and reduce or minimize a loss of data.

The foregoing summary is illustrative only and is not intended to be in any way limiting. In addition to the illustrative aspects, forms, and features described above, further aspects, forms, and features will become apparent by reference to the drawings and the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
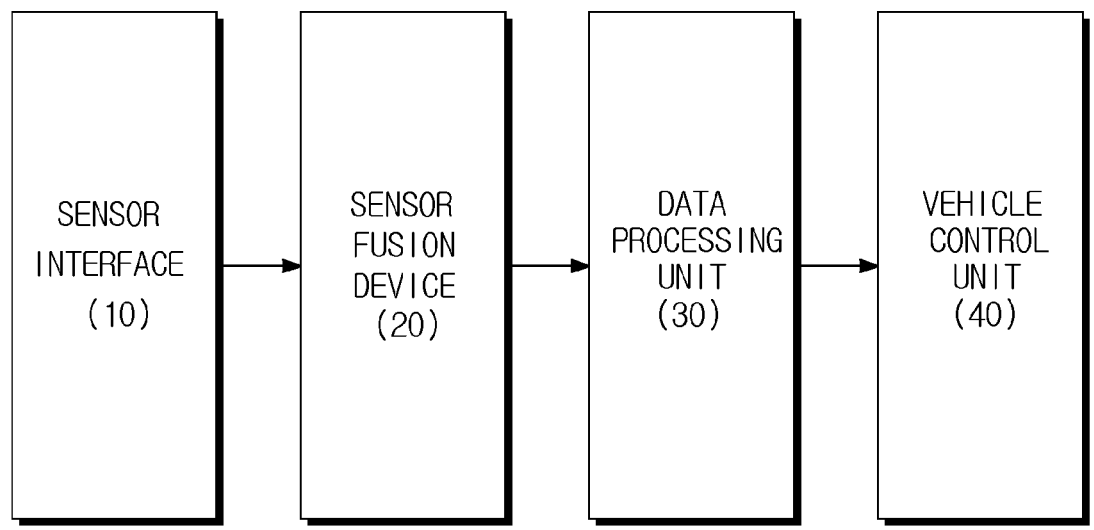
FIG. 1 is a block diagram schematically illustrating a configuration of a vehicle control system including a sensor fusion device according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present disclosure, the specific descriptions of publicly known related configurations or functions will be omitted when it is determined that the specific descriptions may obscure the subject matter of the present disclosure. Further, the exemplary forms of the present disclosure will be described below, but the technical spirit of the present disclosure is not limited thereto and may of course be modified and variously carried out by those skilled in the art.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

Also, the terms, such as 'unit' or 'module', etc., should be understood as a unit that processes at least one function or operation and that may be embodied in a hardware manner (e.g., a processor), a software manner, or a combination of the hardware manner and the software manner.

FIG. 1 is a block diagram schematically illustrating a configuration of a vehicle control system including a sensor fusion device according to an exemplary form of the present disclosure.

Referring to FIG. 1, a vehicle control system 1 may include a sensor interface 10 configured to receive sensor data from a plurality of sensors mounted in a vehicle, a sensor fusion device 20 configured to integrate the sensor data inputted through the sensor interface 10, a data processing unit 30 configured to produce a control signal by processing the integrated sensor data integrated by the sensor fusion device 20, and a vehicle control unit 40 configured to control the vehicle based on the control signal of the data processing unit 30.

The sensor interface 10 may be provided based on types of sensors or types of sensor data outputted from the sensors.

The sensor fusion device 20 serves to integrate the sensor data in consideration of types of sensor data, time, priorities, and the like, and to transmit the integrated sensor data to the data processing unit 30.

The data processing unit 30 may recognize a position of the vehicle, an external environment, an internal condition of the vehicle, a driver condition, or the like by using the integrated sensor data, and may produce, based on the recognition result, the control signal for controlling a specific function of the vehicle.

The vehicle control unit 40 may control the specific function of the vehicle based on the control signal. In this case, the data processing unit 30 or/and the vehicle control unit 40 may not be configured as one module, and may be divided into a plurality of modules in accordance with the respective functions.

Figure 2:
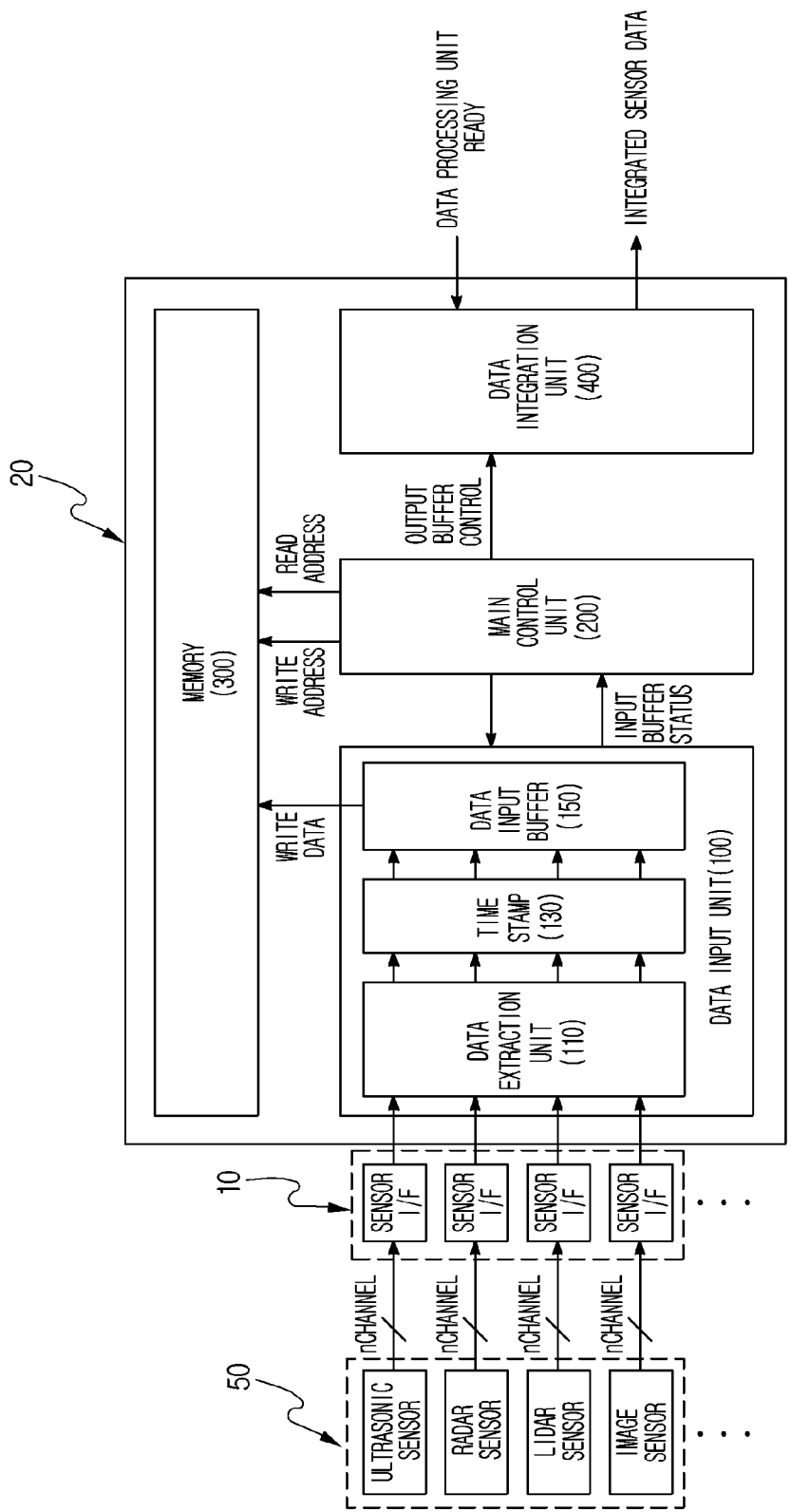
FIG. 2 is a block diagram illustrating a configuration of the sensor fusion device according to one exemplary form of the present disclosure.

FIG. 2 is a block diagram illustrating a configuration of the sensor fusion device according to the exemplary form of the present disclosure.

The sensor fusion device 20 according to the exemplary form of the present disclosure includes a data input unit 100 configured to receive a plurality of sensor data through the sensor interface 10 connected to a plurality of sensors 50, a data integration unit 400 configured to produce the integrated sensor data by integrating the sensor data, a memory 300 configured to provide a storage space for the operations of the data input unit 100 and the data integration unit 400, and a main control unit 200 configured to control the operations of the data input unit 100 and the data integration unit 400.

The sensor 50 is configured to sense information about an internal condition of the vehicle, a driver condition, an external condition of the vehicle, or an environment. For example, the sensors 50 may include an ultrasonic sensor, a radar sensor, a lidar sensor, an image sensor, and the like.

However, the sensor 50 illustrated in FIG. 2 is merely an example. In addition to the sensors 50 illustrated in FIG. 2, various sensors may be connected to the sensor interface 10, or some of the sensors 50 illustrated in FIG. 2 may of course be omitted. In addition, the respective sensors 50 may transmit the sensor data to the sensor interface 10 through a plurality of channels.

The data input unit 100 may receive the sensor data through the sensor interface 10. In the exemplary form, the data input unit 100 removes unnecessary information from a data format of the sensor data, extracts only desired data, and adds time information (time stamp) to the extracted data. The data input unit 100 may function as an input buffer for the received sensor data.

The data input unit 100 may include a data extraction unit 110 configured to receive the sensor data inputted through the sensor interface 10 and remove unnecessary information (e.g., unnecessary parts of header information), and a time stamp 130 configured to add synchronized time information to the extracted data. In addition, the data input unit 100 may further include a data input buffer 150 configured to temporarily store the extracted data for traffic management before storing the extracted information in the memory 300. In the exemplary form, the data input buffer 150 may manage the extracted data by setting priorities to the extracted data in consideration of an increase or decrease in extracted data. The data input unit 100 may store the data, which are temporarily stored in the data input buffer 150, in the memory 300.

The data integration unit 400 integrates the data extracted from the data input unit 100 under control of the main control unit 200. The data integration unit 400 may function as an output buffer for outputting the data.

The main control unit 200 controls the function of the data input unit 100. In the exemplary form, the main control unit 200 may check information about a status of the data input buffer 150 (input buffer status), and transmit an instruction for controlling the operation of the data input buffer 150 to the data input unit 100. In addition, the main control unit 200 may control the data integration unit 400 to allow the data integration unit 400 to produce the integrated sensor data by integrating the data stored in the memory 300.

Figure 3:
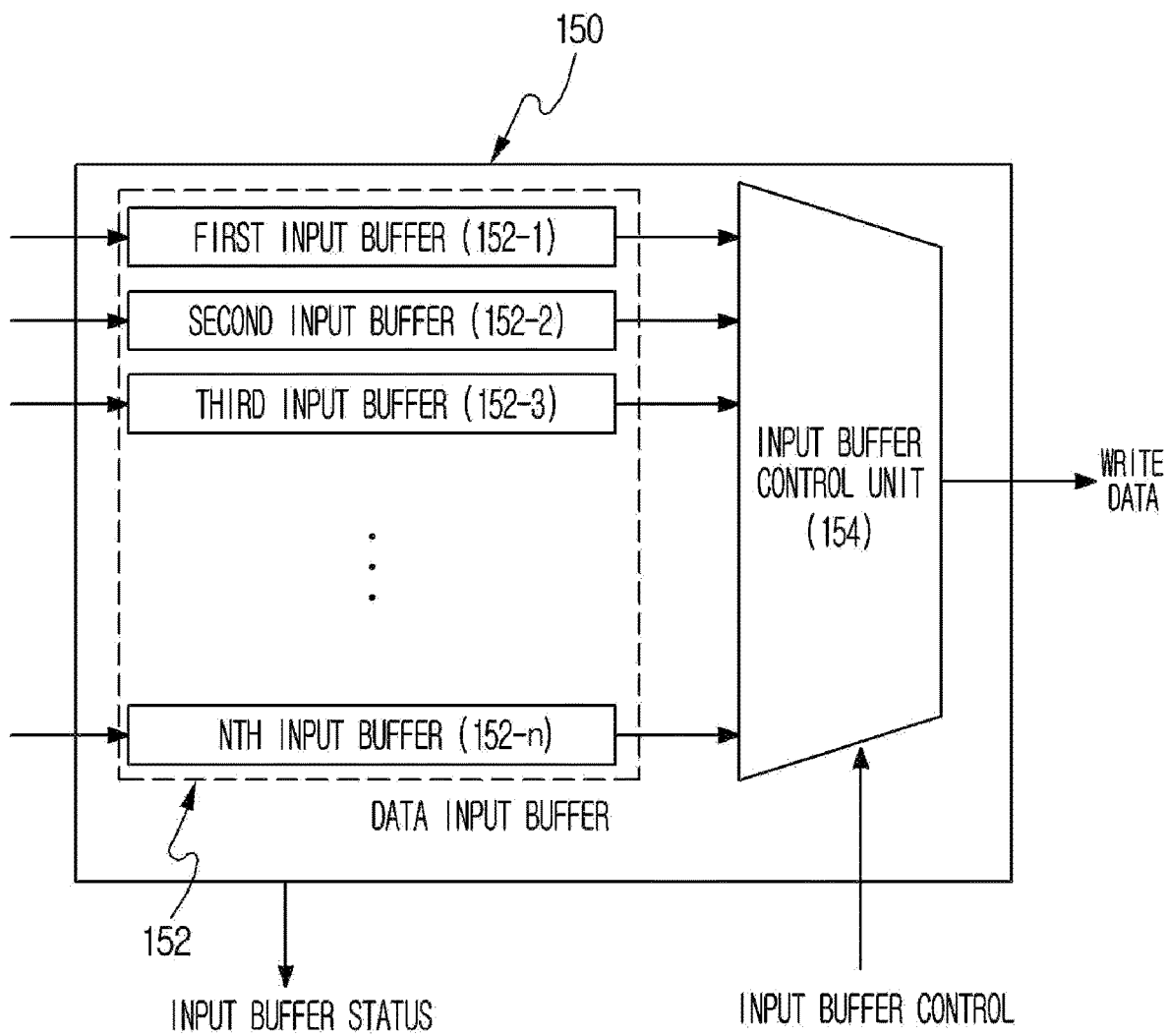
FIG. 3 is a block diagram illustrating a configuration of a data input buffer of a data input unit in the sensor fusion device according to one exemplary form of the present disclosure.
Figure 4:
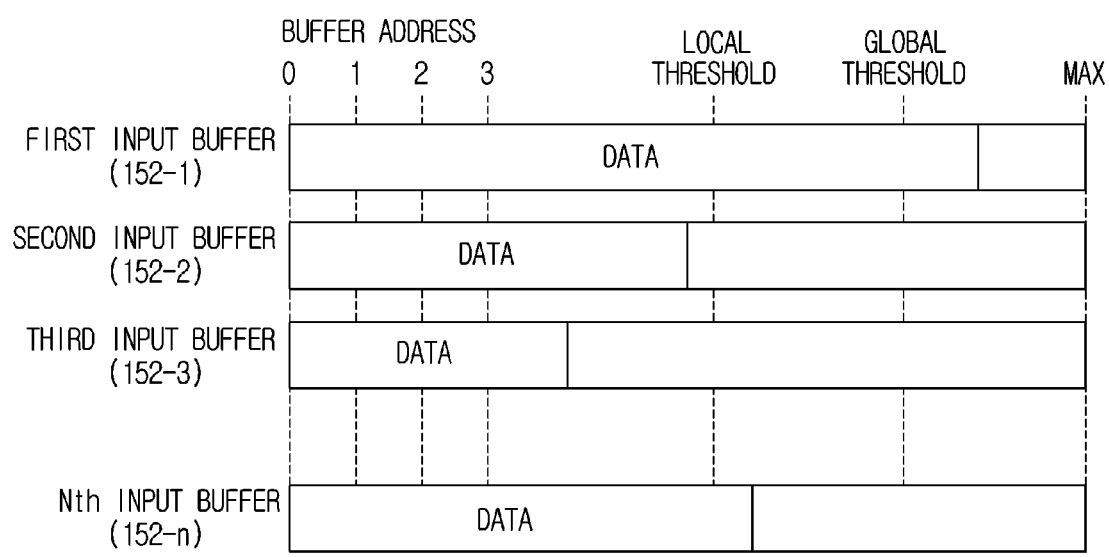
FIG. 4 is a view for explaining management of the data input buffer of the data input unit in the sensor fusion device according to another exemplary form of the present disclosure.

FIG. 3 is a block diagram illustrating a configuration of the data input buffer of the data input unit in the sensor fusion device according to the exemplary form of the present disclosure, and FIG. 4 is a view for explaining management of the data input buffer of the data input unit in the sensor fusion device according to the exemplary form of the present disclosure.

Referring to FIG. 3, the data input buffer 150 of the data input unit 110 may be provided with a plurality of input buffers 152, and an input buffer control unit 154 configured to control the plurality of input buffers 152.

The number of input buffers 152 including the first to Nth input buffers 152-1 to 152-n may be set in consideration of the number of sensors 50 connected to the sensor interface 10. In the exemplary form, the number of input buffers 152 may be equal to the total number of sensors 50 connected to the sensor interface 10. In another exemplary form, the input buffers 152 may be provided by being classified in accordance with the types of sensors 50 connected to the sensor interface 10.

The input buffer control unit 154 may transmit the statuses of the respective input buffers 152 to the main control unit 200, and the main control unit 200 may set thresholds of the respective input buffers 152 and select the input buffer 152 having the data to be transmitted to the memory 300 in consideration of priorities of the data temporarily stored in the respective input buffers 152. The input buffer control unit 154 may transmit the data stored in the specific input buffer 152 to the memory 300 under control of the main control unit 200.

Referring to FIG. 4, a solution for managing the threshold of the input buffer 152 is proposed. In the exemplary form, each of the first to Nth input buffers 152-1 to 152-n has a buffer address, and a maximum data value MAX, which may be temporarily stored, is determined.

A global threshold and a local threshold may be set for the input buffer 152. The global threshold may be a threshold applied in common to all the input buffers 152, and the local threshold may be a threshold applied to the individual input buffer 152. In addition, in the exemplary form of the present disclosure, only the global threshold may be set, and the local threshold may not be set.

The threshold may be used to determine the processing priority of the data stored in the input buffer 152. In the exemplary form, the input buffer control unit 154 may process the data of the input buffer 152, which reach or exceed the threshold, and transmit the data to the memory 300, thereby storing the data.

If the local threshold is set and the local threshold is processed to the global threshold, the data of the input buffer 152, which reach the local threshold, may be processed even though the amount of data of the input buffer 152 does not reach the global threshold. In addition, in the exemplary form, the local threshold may be determined differently in accordance with the types or characteristics of the sensor data. For example, the local threshold of the input buffer 152, which processes the sensor data related to safety of the vehicle, may be set to be lower than the local threshold of the input buffer 152 that processes the sensor data related to convenience.

In the example illustrated in FIG. 4, the data of the first input buffer 152-1, which temporarily stores the data exceeding the global threshold, need to be processed. The input buffer control unit 154 may transmit the data of the first input buffer 152-1 to the memory 300, thereby storing the data. Meanwhile, the Nth input buffer 152-n stores the data exceeding the local threshold. If the local threshold of the Nth input buffer 152-n is to the global threshold and the Nth input buffer 152-n has a higher priority than the first input buffer 152-1, the data of the Nth input buffer 152-n may be processed to the first input buffer 152-1.

The input buffer control unit 154 may adjust the amount of data temporarily stored in each of the input buffers 152 to manage the data of the input buffer 152 so that the data of the input buffer 152 do not exceed the global threshold. In a case in which the data of the input buffer 152 exceed the global threshold, the input buffer control unit 154 may check a space remaining in the buffer and process the data of the corresponding input buffer 152. If the remaining space in the input buffer 152 is insufficient, the input buffer control unit 154 may temporarily stop the input of the sensor data.

Referring to FIG. 2, the main control unit 200 receives the status (input buffer status) of the data input buffer 150 from the data input buffer 150 and transmits an input buffer control signal for controlling the input buffer. The data input unit 100 transmits the data, which are stored in the data input buffer 150, to the memory 300, thereby storing the data.

Meanwhile, when writing the data, which are stored in the data input buffer 150, to the memory 300, the main control unit 200 checks the address of the memory 300 to produce a memory map, and then transmits the address of the memory 300 to the data integration unit 400. The main control unit 200 transmits an output buffer control signal for controlling the output buffer to the data integration unit 400, and the data integration unit 400 reads the data stored in the memory 300 to produce the integrated sensor data.

Figure 5:
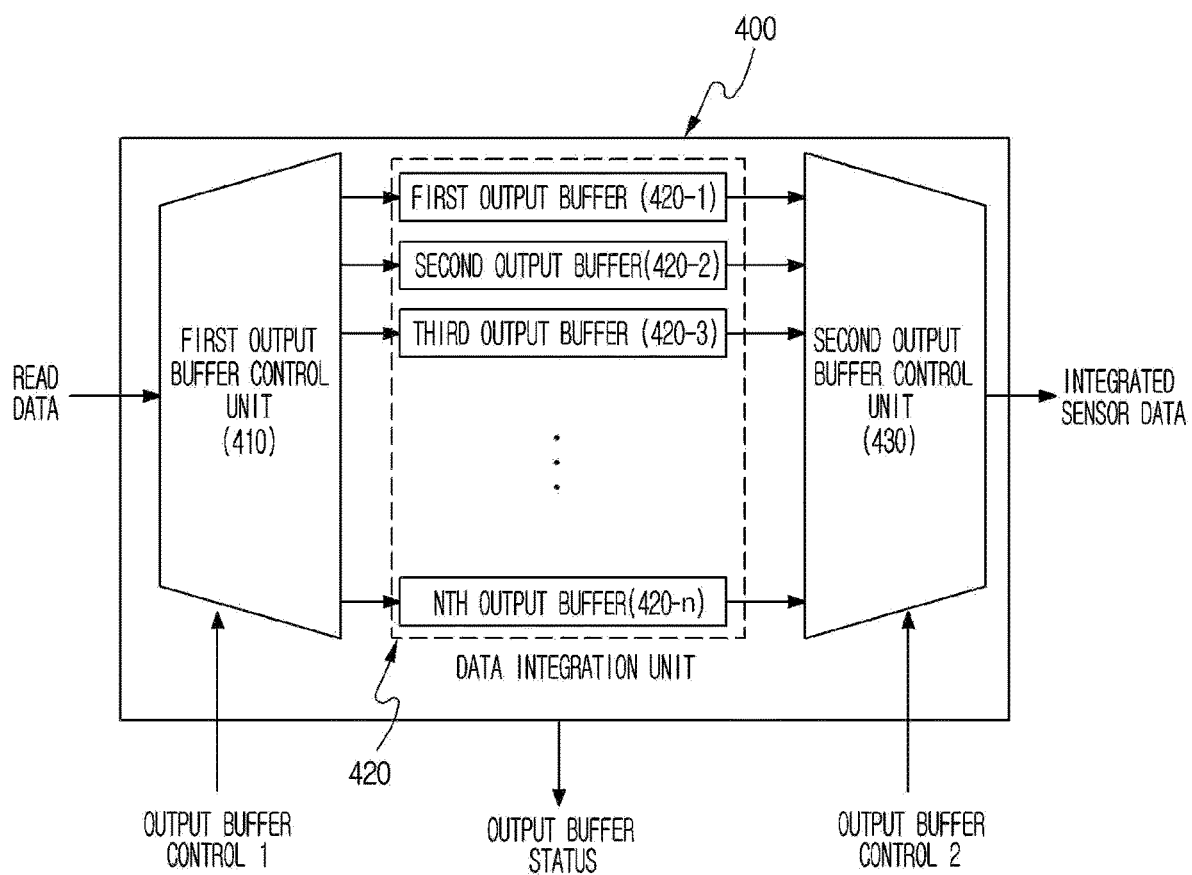
FIG. 5 is a block diagram illustrating a configuration of a data integration unit in the sensor fusion device according to one exemplary form of the present disclosure.

FIG. 5 is a block diagram illustrating a configuration of the data integration unit in the sensor fusion device according to the exemplary form of the present disclosure.

The data integration unit 400 includes a first output buffer control unit 410 configured to read the data stored in the memory 300, an output buffer 420 configured to temporarily store the data, which are transmitted through the first output buffer control unit 410, by classifying the data in accordance with the sensor type, the time information, or the channel information, and a second output buffer control unit 430 configured to receive the data from the output buffer 420 and integrate the data. The second output buffer control unit 430 produces the integrated sensor data by integrating the plurality of sensor data and then outputs the integrated sensor data to the outside.

The main control unit 200 may control the operation of the first output buffer control unit 410 by transmitting a first output buffer control signal (output buffer control 1) to the first output buffer control unit 410. In addition, the main control unit 200 may control the operation of the second output buffer control unit 430 by transmitting a second output buffer control signal (output buffer control 2) to the second output buffer control unit 430. Meanwhile, the main control unit 200 may receive the statuses (output buffer status) of the plurality of output buffers 420 and control the operations of the first output buffer control unit 410 and the second output buffer control unit 430 in accordance with the statuses.

In addition, the main control unit 200 may manage a delay, a loss, or a bandwidth when producing the integrated sensor data in accordance with types of data, characteristics, time, and the like, and set and control the priority when producing the integrated sensor data.

In the exemplary form, modes (output modes) in which the data integration unit 400 produces the integrated sensor data by integrating the sensor data include an identical sensor mode, an identical time mode, and an adaptive mode.

Figure 6:
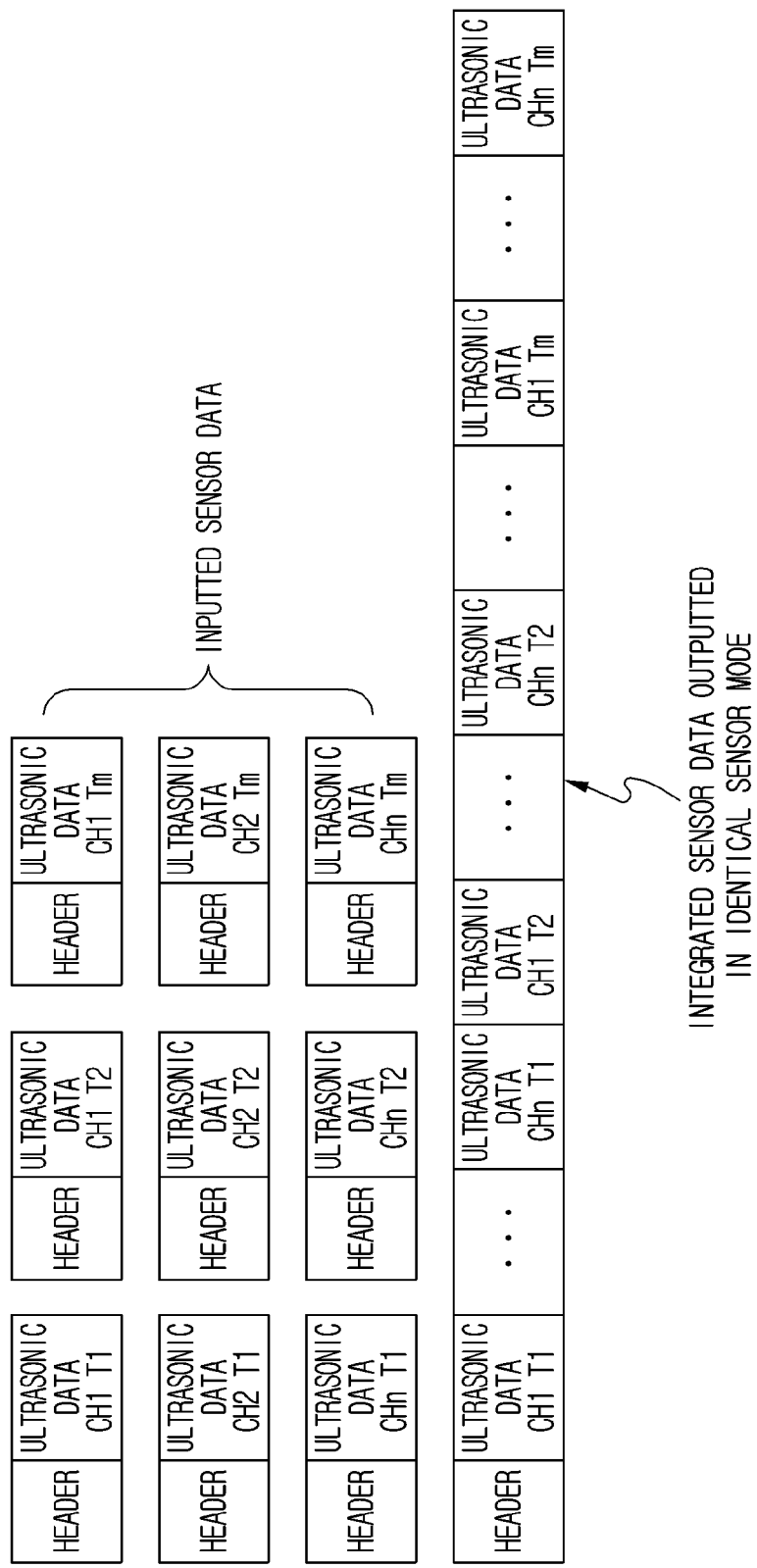
FIG. 6 is a view exemplarily illustrating a process in which the data integration unit produces integrated sensor data in an identical sensor mode from sensor data in the sensor fusion device according to the exemplary form of the present disclosure.
Figure 7:
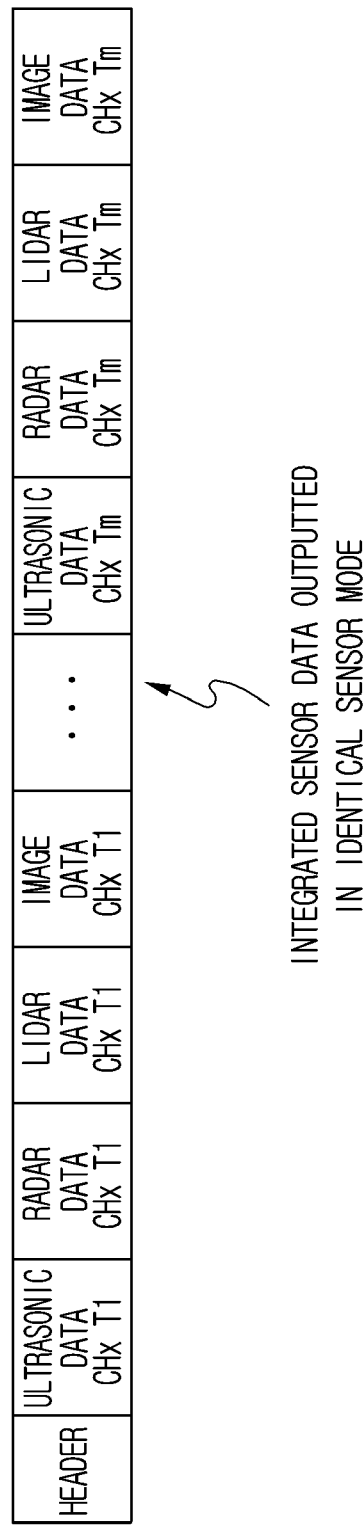
FIG. 7 is a view exemplarily illustrating a process in which the data integration unit produces integrated sensor data in an identical time mode from sensor data in the sensor fusion device according to one exemplary form of the present disclosure.

FIG. 6 exemplarily illustrates a process in which the data integration unit produces the integrated sensor data in the identical sensor mode from the sensor data in the sensor fusion device according to the exemplary form of the present disclosure, and FIG. 7 exemplarily illustrates a process in which the data integration unit produces the integrated sensor data in the identical time mode from the sensor data in the sensor fusion device according to the exemplary form of the present disclosure.

Referring to FIG. 6, the sensor data, which are inputted to the data input unit 100 over a plurality of times through the plurality of channels, are integrated in the identical sensor mode by the data integration unit 400 and then outputted. FIG. 6 exemplarily illustrates the example in which the plurality of ultrasonic data is inputted from the ultrasonic sensor, but the sensor data may also be integrated in the same manner as the sensor data of the radar sensor, the lidar sensor, or the image sensor.

The sensor data inputted to the data input unit 100 may have channel information CH1 to CHn and time information. The data input unit 100 eliminates unnecessary information from the inputted sensor data, and the sensor data extracted from the data input unit 100 are temporarily stored in the memory 300 and then integrated by the data integration unit 400.

FIG. 6 exemplarily illustrates the example in which the plurality of sensor data from the identical sensors is sorted in time order in the identical sensor mode, but one integrated sensor data may be produced by sorting the plurality of sensor data in order of the channels.

FIG. 7 exemplarily illustrates that the sensor data inputted from the plurality of sensors 50 of different types are integrated in the identical time mode. The data integration unit 400 sorts the plurality of sensor data, which is inputted from the different sensors, by the identical time and outputs the integrated sensor data. In the example illustrated in FIG. 7, the sensor data are integrated in accordance with the time from T1 to Tm, but in the exemplary form of the present disclosure, only the sensor data at a specific time may be integrated.

Figure 8:
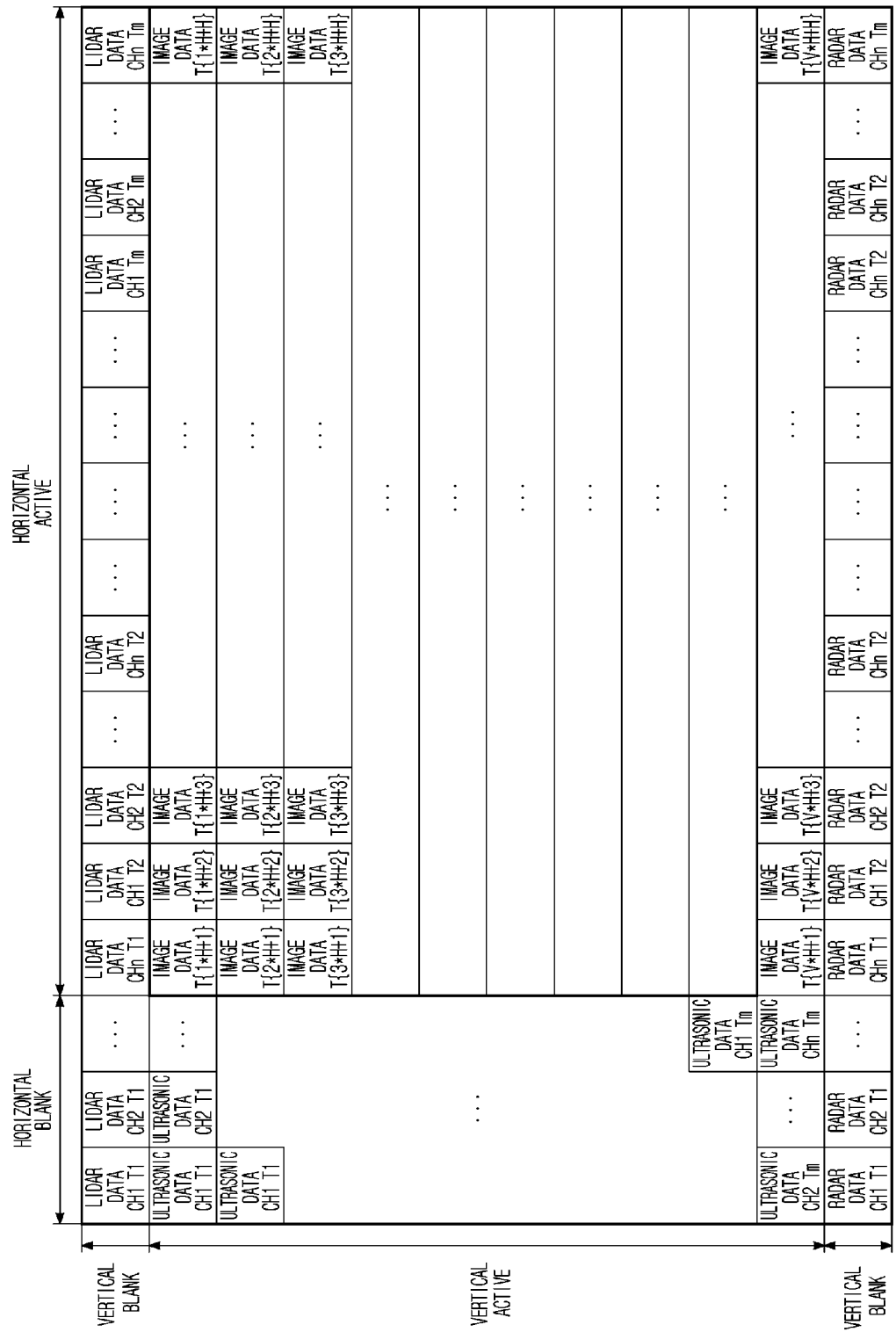
FIG. 8 is a view exemplarily illustrating a process in which the data integration unit produces integrated sensor data in an adaptive mode from sensor data in the sensor fusion device according to one exemplary form of the present disclosure.

FIG. 8 exemplarily illustrates a process in which the data integration unit produces integrated sensor data in the adaptive mode from the sensor data in the sensor fusion device according to the exemplary form of the present disclosure.

In the case of typical image data, horizontal and vertical sections of an image frame are classified into an active region in which an actual image is loaded and a blank section in which no image data are loaded, and the data is transmitted only to the active region.

In contrast, the adaptive mode proposed by the present disclosure operates in a way to adaptively transmit the data by utilizing the active region and the blank region of the image frame, such that only the image data are transmitted to the active region, and other sensor data are integrated and transmitted to the blank region. In this case, the identical time mode and the identical sensor mode may be selectively transmitted.

Next, a sensor fusion method according to the exemplary form of the present disclosure will be described.

Figure 9:
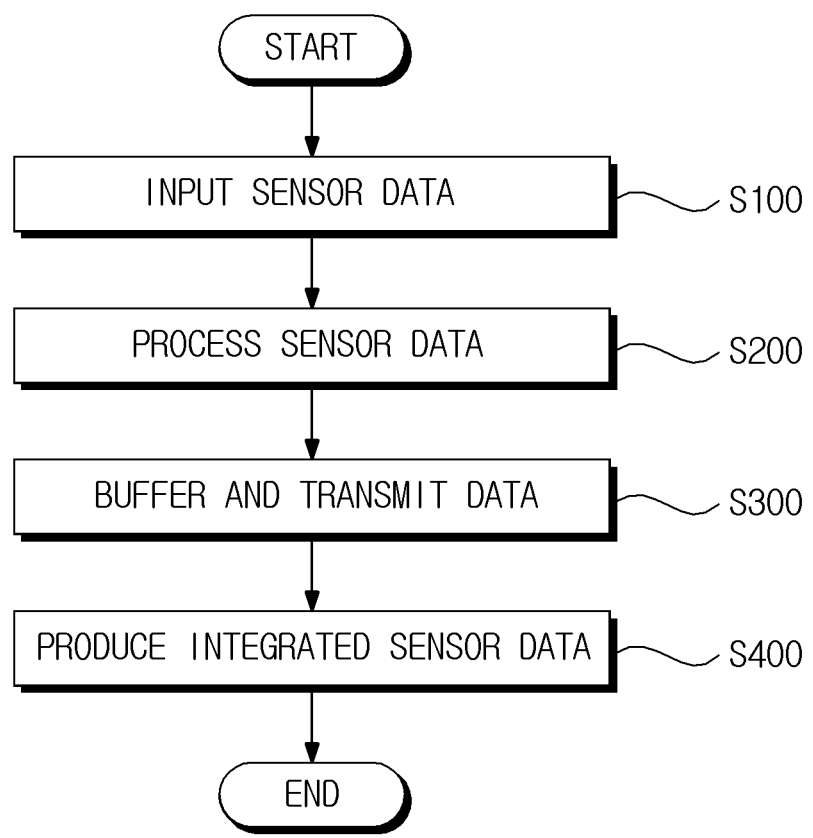
FIG. 9 is a flowchart of a sensor fusion method according to another exemplary form of the present disclosure.
Figure 10:
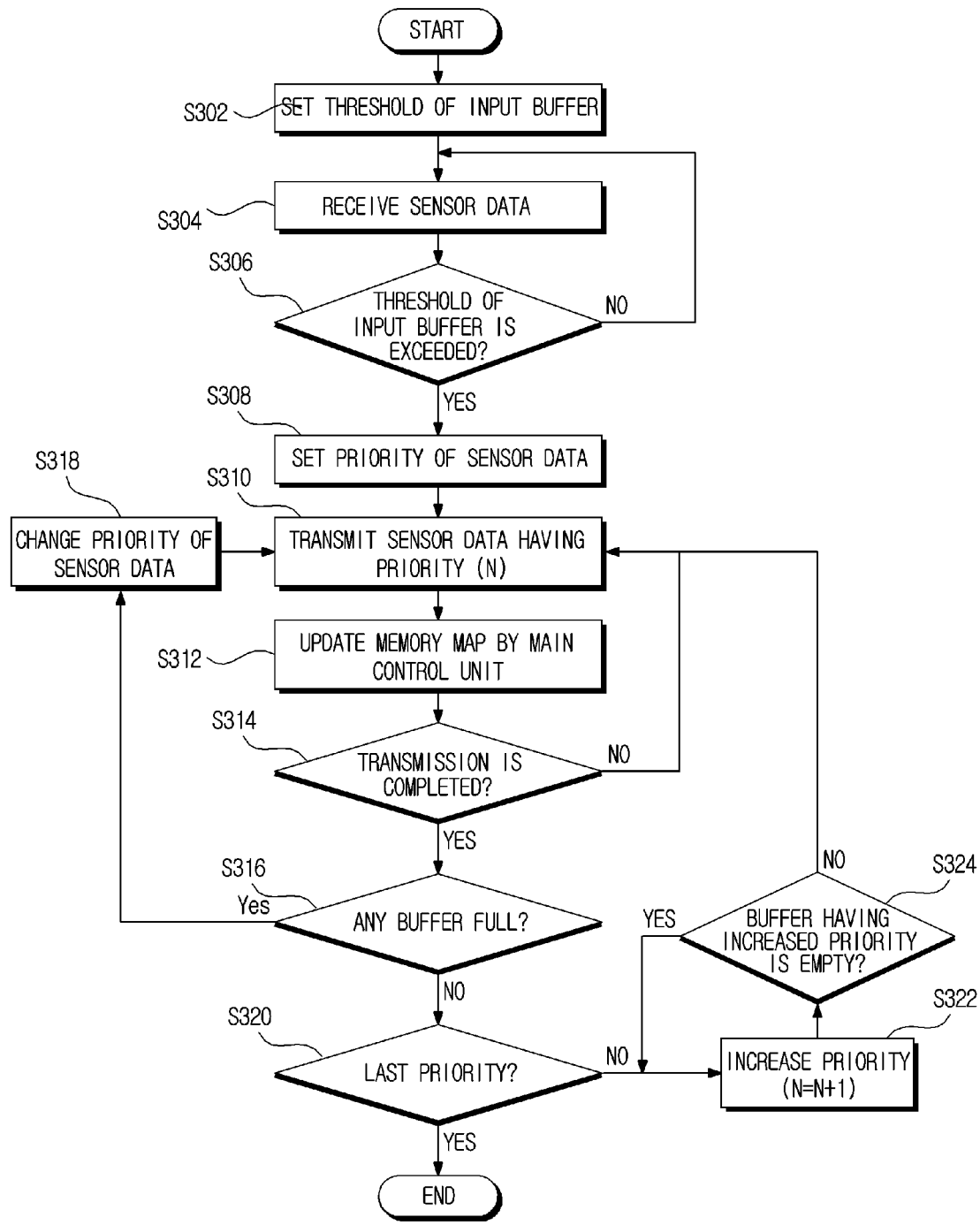
FIG. 10 is a flowchart specifically illustrating a step of buffering and transmitting data in the sensor fusion method according to one exemplary form of the present disclosure.
Figure 11:
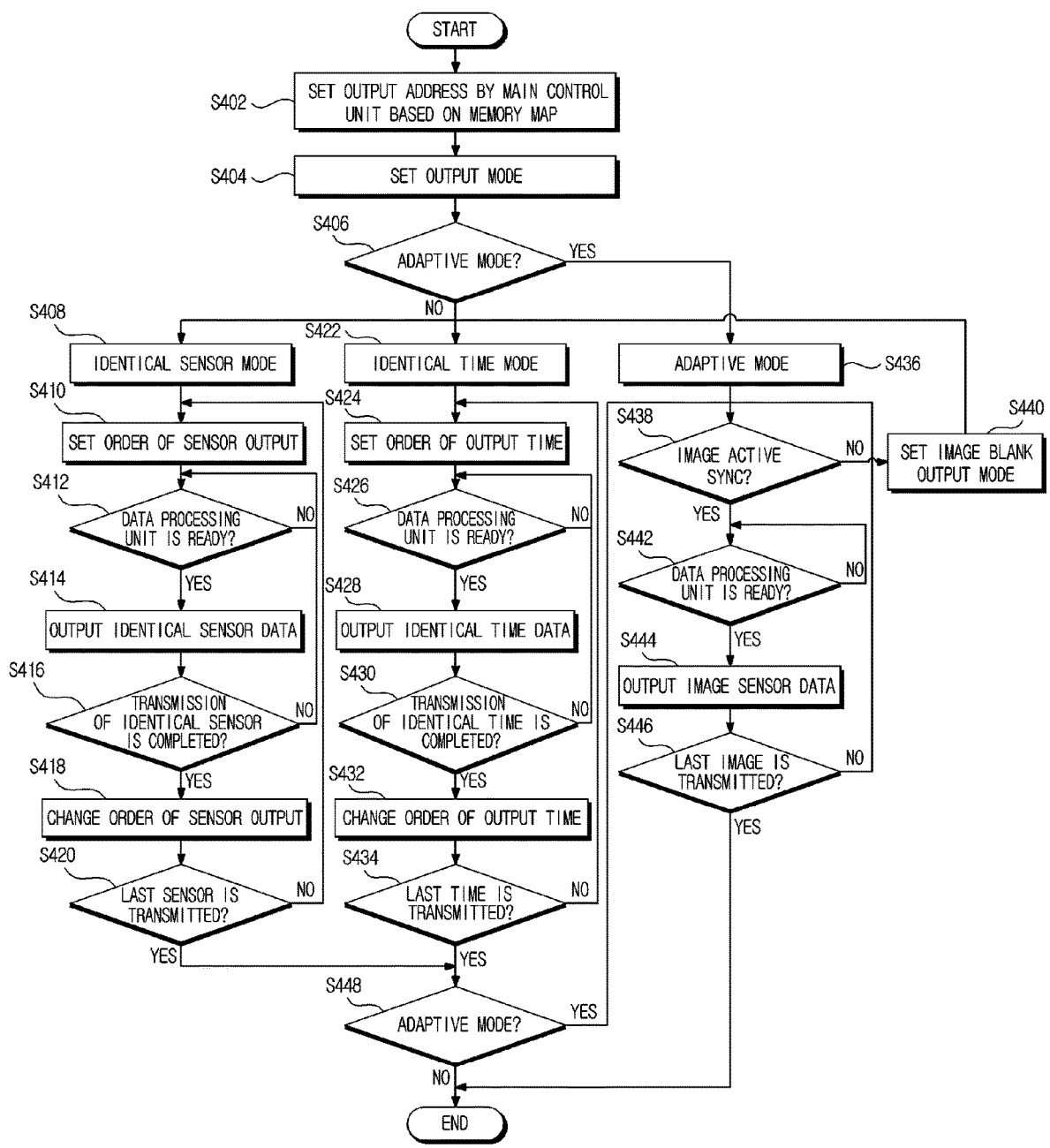
FIG. 11 is a flowchart specifically illustrating a step of producing integrated sensor data in the sensor fusion method according to one exemplary form of the present disclosure.

FIG. 9 is a flowchart of the sensor fusion method according to the exemplary form of the present disclosure, FIG. 10 is a flowchart specifically illustrating a step of buffering and transmitting data in the sensor fusion method according to the exemplary form of the present disclosure, and FIG. 11 is a flowchart specifically illustrating a step of producing integrated sensor data in the sensor fusion method according to the exemplary form of the present disclosure.

The sensor fusion method according to the exemplary form of the present disclosure may include a step S100 of receiving the plurality of sensor data through the sensor interface 10, a sensor data processing step S200 of eliminating unnecessary information or extracting desired information from the inputted sensor data and adding time information, a step S300 of buffering, by the data input buffer 150, the processed sensor data and transmitting the processed sensor data, and a step S400 of producing integrated sensor data by integrating the sensor data.

The process of buffering, by the data input buffer 150, the data and transmitting the data will be described in more detail with reference to FIG. 10.

The main control unit 200 may set the threshold of the input buffer 152 (S302). In the exemplary form, the thresholds may include the global threshold that may be applied to all the input buffers 152, and the local threshold that may be applied to each of the input buffers 152.

The input buffer 152 receives the sensor data from the sensor 50 through the sensor interface 10 (S304). In the exemplary form, the plurality of input buffers 152 is provided, and each of the input buffers 152 may be assigned to the specific sensor 50.

The main control unit 200 may receive the status of the input buffer 152 from the input buffer control unit 154 and manage the data of the input buffer 152 so that the amount of data of the input buffer 152 does not exceed the threshold.

To this end, the main control unit 200 determines whether the amount of data of the input buffer 152 exceeds the threshold (S306).

When the threshold of the input buffer 152 is exceeded, the priority of the sensor data to be transmitted to the memory 300 may be set in accordance with the status of each of the input buffers 152 (S308).

The sensor data of the input buffer 152 having the highest priority in accordance with the priority are transmitted to the memory 300 (S310).

Meanwhile, the main control unit 200 updates a memory map related to the sensor data stored in the memory 300 (S312).

The data of the input buffer 152 having the highest priority are transmitted to the memory 300, and whether the transmission of the data is completed is checked (S314). If the data are not transmitted, the process returns to the step S310 to continue transmitting the data.

During the transmission, whether any one of the input buffers 152 reaches a temporarily storable maximum data value MAX may be checked (S316).

If the specific input buffer 152 reaches the temporarily storable maximum data value MAX, the priority of the sensor data is changed (S318), and the data may be transmitted to the memory 300 in accordance with the changed priority.

In accordance with the priority, whether the transmission of the data related to the input buffer 152 having the lowest priority is completed is checked (S320). If the transmission of the data of the input buffer 152 in accordance with the priority is not completed, the priority of the next-priority input buffer 152 having the next priority to the input buffer 152 having the completely transmitted data is increased (S322), and the data of the input buffer 152 having the increased priority is transmitted if the corresponding input buffer 152 is not in an empty status.

Next, a process of producing the integrated sensor data will be specifically described with reference to FIG. 11.

The main control unit 200 sets an output address of a memory map, in which the data to be outputted are stored, based on a memory map related to a storage address of the data stored in the memory 300 (S402). The output address of the memory map may be determined in accordance with a data integration method.

The output mode for producing and outputting the integrated sensor data is set (S404).

As a method of producing the integrated sensor data, any one of the identical sensor mode S408, the identical time mode S422, and the adaptive mode S436 may be set. In the exemplary form, the adaptive mode S436 may include any one of the identical sensor mode S408 and the identical time mode S422, such that it is possible to check whether the set output mode is the adaptive mode (S406).

In the case in which the identical sensor mode is set (S408), the order of outputting the sensor data is set (S410). The identical sensor mode outputs the data of the identical sensors 50, and in the exemplary form, the order of outputting the sensor data may be set in the identical time or the identical order of the channels.

Whether the data processing unit 30 to receive the integrated sensor data is in a ready state may be checked (S412).

The data integration unit 400 produces the integrated sensor data for the identical sensors and outputs the integrated sensor data to the data processing unit 30 (S414).

Whether the transmission of the integrated sensor data for the identical sensors is completed may be checked (S416).

When the integrated sensor data for the specific identical sensors is outputted, the order is changed to the next sensor to output data (S418), and whether the integrated sensor data for all the sensor desired to be transmitted are produced and transmitted may be checked (S420).

In the case in which the identical time mode is set (S422), the order in accordance with the output time of the sensor data is set (S424). The identical time mode outputs the sensor data of the plurality of sensors 50 in the identical time, and the order in accordance with the type of sensor in the identical time or the order of channels for the specific sensor may be set.

Whether the data processing unit 30 to receive the integrated sensor data is in a ready state may be checked (S426).

The data integration unit 400 produces the integrated sensor data for the identical time and outputs the integrated sensor data to the data processing unit 30 (S428).

Whether the transmission of the integrated sensor data for the identical time is completed may be checked (S430).

When the integrated sensor data for the specific time is outputted, the order is changed to the next time to be outputted (S432), and whether the integrated sensor data for all times desired to be transmitted are produced and transmitted may be checked (S434).

When it is checked in step S406 that the mode is the adaptive mode, the process is performed in the adaptive mode (S436). As described above, in the adaptive mode, only the image data may be transmitted to the active region of the image frame, and other sensor data may be integrated and transmitted to the blank region.

In the active region of the image frame (S438), the ready state of the data processing unit 30 is checked (S442), and the output of the image sensor data is performed (S444 and S446).

The output mode may be set to any one of the identical sensor mode and the identical time mode in the blank region instead of the active region (S440).

In the case of the identical sensor mode (S408), the integrated sensor data are produced in accordance with steps S410 to S420 and transmitted through the blank region of the image frame.

In the case of the identical time mode (S422), the integrated sensor data are produced in accordance with steps S424 to S434 and transmitted through the blank region of the image frame.

In addition, when it is determined in step S448 that the mode is the adaptive mode, the process returns to the step S438, and the above-mentioned procedures are repeated.

The above description is simply given for illustratively describing the technical spirit of the present disclosure, and those skilled in the art to which the present disclosure pertains will appreciate that various modifications, changes, and substitutions are possible without departing from the essential characteristic of the present disclosure. Accordingly, the exemplary forms disclosed in the present disclosure and the accompanying drawings are intended not to limit but to describe the technical spirit of the present disclosure, and the scope of the technical spirit of the present disclosure is not limited by the exemplary forms and the accompanying drawings. The protective scope of the present disclosure should be construed based on the following claims, and all the technical spirit within the equivalent scope thereto should be construed as falling within the scope of the present disclosure.

As described above, the exemplary forms have been described and illustrated in the drawings and the specification. The exemplary forms were chosen and described in order to explain certain principles of the present disclosure and their practical application, to thereby enable others skilled in the art to make and utilize various exemplary forms of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the present disclosure are deemed to be covered by the present disclosure which is limited only by the claims which follow.

What is claimed is:

1. A sensor fusion device for a vehicle, the sensor fusion device comprising:
    a processor configured to receive sensor data of a plurality of sensors through a sensor interface, the processor comprising a data input buffer configured to manage input traffic of the sensor data and configured to produce integrated sensor data by integrating the sensor data, the processor further comprising an output buffer configured to integrate the integrated sensor data; and
    a memory configured to provide a storage space for operating the processor; and
    wherein the data input buffer comprises: a plurality of input buffers,
    wherein the processor is further configured to manage statuses of the plurality of input buffers, and
    wherein thresholds are set to the plurality of input buffers to manage an input and an output of the sensor data, and wherein the thresholds comprise:
        a global threshold applied in common to the plurality of input buffers; and
        a local threshold individually applied to the plurality of input buffers.

2. The sensor fusion device of claim 1, wherein the processor is further configured to receive the sensor data and extract desired data and includes:
    a time stamp configured to add time information to the extracted data.

3. The sensor fusion device of claim 1, wherein the plurality of input buffers is provided based on types of sensors.

4. The sensor fusion device of claim 1, wherein the processor is further configured to set priorities based on the thresholds of the plurality of input buffers and to control the sensor data stored in the plurality of input buffers to store the sensor data in the memory.

5. The sensor fusion device of claim 1, wherein the processor is further configured to operate in at least one of an identical sensor mode in which the sensor data of identical sensors, among the plurality of sensors, are integrated to produce the integrated sensor data, an identical time mode in which the sensor data in the identical time are integrated to produce the integrated sensor data, or an adaptive mode in which image data of an image frame and the sensor data based on the identical sensor mode or the identical time mode are integrated to produce the integrated sensor data.

6. The sensor fusion device of claim 5, wherein the adaptive mode comprises the image data in an active region of the image frame, and integrated sensor data, which are integrated based on any one of the identical sensor mode and the identical time mode, in a blank region of the image frame.

7. The sensor fusion device of claim 1, wherein the processor is further configured to operate in at least one of an identical sensor mode in which the sensor data of identical sensors, among the plurality of sensors, are integrated to produce the integrated sensor data, an identical time mode in which the sensor data in the identical time are integrated to produce the integrated sensor data, or an adaptive mode in which image data of an image frame and the sensor data based on the identical sensor mode or the identical time mode are integrated to produce the integrated sensor data.

8. The sensor fusion device of claim 1, wherein the processor is further configured to receive the sensor data based on information about an address of the memory, and configured to integrate the sensor data temporarily stored in the output buffer.

* * * * *